United States Patent
Pednekar et al.

(10) Patent No.: US 10,505,903 B1
(45) Date of Patent: Dec. 10, 2019

(54) SYSTEM AND METHOD OF OBTAINING DATA FROM PRIVATE CLOUD BEHIND ENTERPRISE FIREWALL

(71) Applicant: EMC IP Holding Company LLC, Hopkinton, MA (US)

(72) Inventors: Rohan Pednekar, Maharashtra (IN); Pramod Biradar, Maharashtra (IN); Ritansh Raj, Maharashtra (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 174 days.

(21) Appl. No.: 15/650,549

(22) Filed: Jul. 14, 2017

(51) Int. Cl.
*H04L 29/00* (2006.01)
*H04L 29/06* (2006.01)
*H04L 9/30* (2006.01)
*G06F 21/31* (2013.01)

(52) U.S. Cl.
CPC ........... *H04L 63/029* (2013.01); *G06F 21/31* (2013.01); *H04L 9/30* (2013.01); *H04L 63/0428* (2013.01); *H04L 63/061* (2013.01); *H04L 63/08* (2013.01)

(58) Field of Classification Search
CPC . H04L 67/10; H04L 63/1433; H04L 63/1483; H04L 63/20; H04L 63/0823
See application file for complete search history.

(56) References Cited

U.S. PATENT DOCUMENTS

| | | | |
|---|---|---|---|
| 5,963,959 A | 10/1999 | Sun et al. | |
| 6,085,298 A | 7/2000 | Ohran | |
| 2005/0177772 A1 | 8/2005 | Derks et al. | |
| 2008/0034176 A1 | 2/2008 | Akutsu et al. | |
| 2011/0209064 A1* | 8/2011 | Jorgensen | G06F 9/54 715/733 |
| 2014/0149698 A1 | 5/2014 | Ezra et al. | |
| 2015/0052108 A1 | 2/2015 | Volk et al. | |
| 2017/0017907 A1* | 1/2017 | Narasimhan | G06Q 10/063 |
| 2017/0109243 A1 | 4/2017 | Kumar | |

OTHER PUBLICATIONS

Author unknown; "Open VPN website how to section"; OpenVPN Technologies, Inc; https://web.archive.org/web/20150806052927/https://openvpn.net/index.php/open-sourceldocumentation/howto.html; Aug. 6, 2015.

* cited by examiner

*Primary Examiner* — Ghazal B Shehni
(74) *Attorney, Agent, or Firm* — Chamberlain, Hrdlicka, White, Williams & Aughtry

(57) ABSTRACT

A public cloud includes a processor. The processor obtains, from a client via a first network connection, a data access request that specifies data stored in a private cloud separated from the public cloud server by a firewall; sends the data access request to the private cloud through the firewall via a second network connection; receives the data stored in the private cloud via the second network connection; and forwards the received data stored in the private cloud to the client.

18 Claims, 7 Drawing Sheets

US 10,505,903 B1

SYSTEM AND METHOD OF OBTAINING DATA FROM PRIVATE CLOUD BEHIND ENTERPRISE FIREWALL

BACKGROUND

Computing devices generate, use, and store data. The data may be, for example, images, document, webpages, or meta-data associated with any of the files. The data may be stored locally on a persistent storage of a computing device and/or may be stored remotely on a persistent storage of another computing device.

SUMMARY

In one aspect, a public cloud server in accordance with one or more embodiments of the invention includes a processor. The processor obtains, from a client via a first network connection, a data access request that specifies data stored in a private cloud separated from the public cloud server by a firewall; sends the data access request to the private cloud through the firewall via a second network connection; receives the data stored in the private cloud via the second network connection; and forwards the received data stored in the private cloud to the client.

In one aspect, a method of operating a public cloud server in accordance with one or more embodiments of the invention includes obtaining, by the public cloud server from a client via a first network connection, a data access request that specifies data stored in a private cloud separated from the public cloud server by a firewall; sending, by the public cloud server, the data access request to the private cloud through the firewall via a second network connection; receiving, by the public cloud server, the data stored in the private cloud via the second network connection; and forwarding, by the public cloud server, the received data stored in the private cloud to the client.

In one aspect, a non-transitory computer readable medium in accordance with one or more embodiments of the invention includes computer readable program code, which when executed by a computer processor enables the computer processor to perform a method for operating a public cloud server. The method includes obtaining, by the public cloud server from a client via a first network connection, a data access request that specifies data stored in a private cloud separated from the public cloud server by a firewall; sending, by the public cloud server, the data access request to the private cloud through the firewall via a second network connection; receiving, by the public cloud server, the data stored in the private cloud via the second network connection; and forwarding, by the public cloud server, the received data stored in the private cloud to the client.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to devices, methods, and systems for accessing a private cloud behind a firewall. To facilitate access to the private cloud behind the firewall by a client, a public cloud sever may be utilized. The public cloud server may establish a secure socket layer (SSL) connection with the private cloud to facilitate communications between the private cloud server and the public cloud server through the firewall. A virtual private network (VPN) including the client, public cloud server, and the private cloud may be established. Data may then be transmitted to the client from the private cloud via the VPN.

In one or more embodiments of the invention, the public cloud server may establish a separate SSL connection for each client that requests to access data stored in the private cloud. A separate VPN may then be established for each client including the respective client, the public cloud server, and the private cloud.

In one or more embodiments of the invention, the private cloud server may include backup data associated with a client. A client may retrieve the backup data from the private cloud using a corresponding VPN that utilizes an associated SSL connection to repair or otherwise reconfigure the client.

Figure 1:
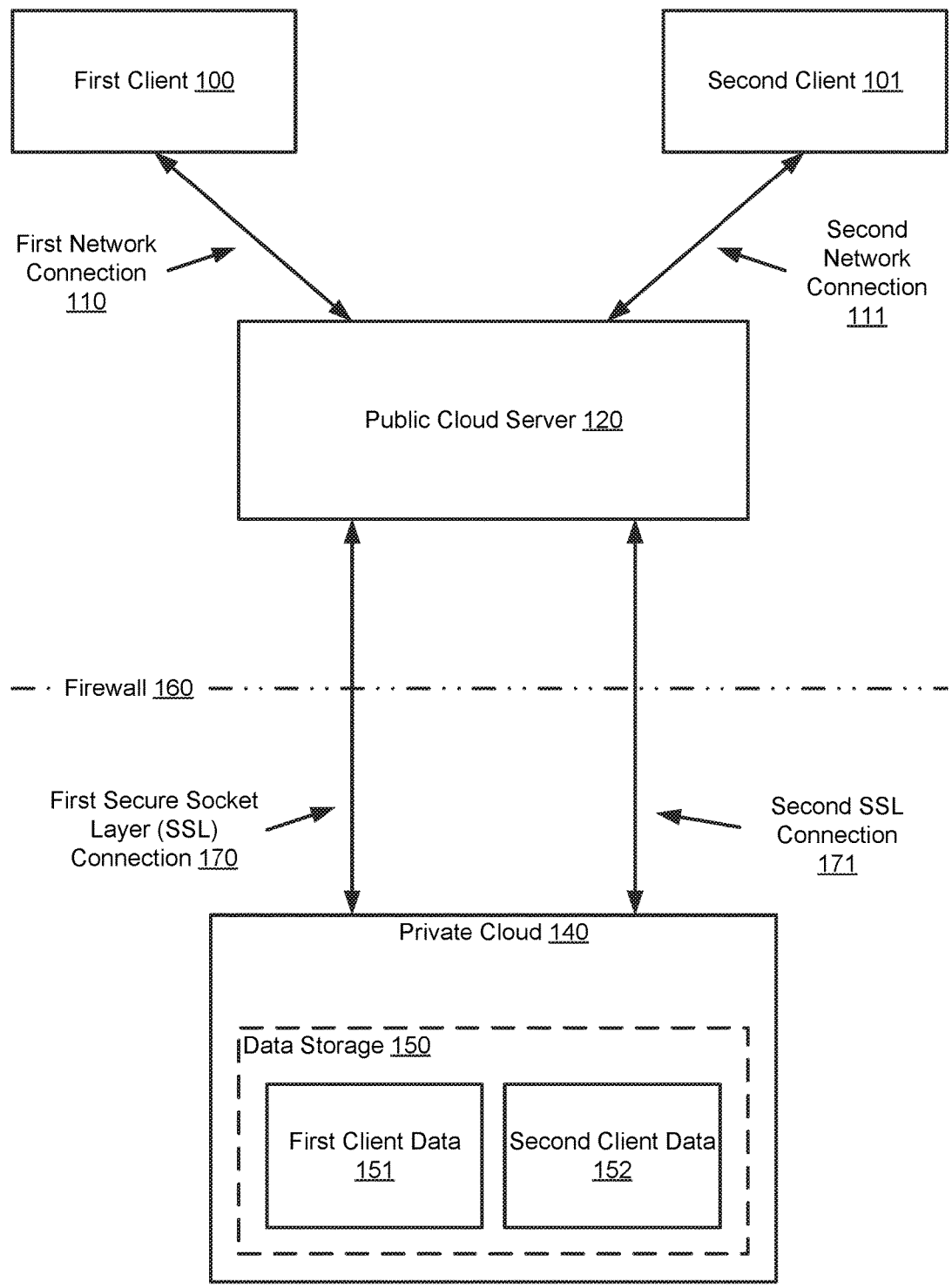
FIG. 1 shows a diagram of a system in accordance with one or more embodiments of the invention.

FIG. 1 shows a system in accordance with one or more embodiments of the invention. The system may include clients (100, 101), a public cloud server (120), and a private cloud (140). The system may provide the clients (100, 101)

with access to data stored in the private cloud (140) even though the clients (100, 101) are separated from the private cloud (140) by a firewall (160). In one or more embodiments of the invention, the system may enable clients (100, 101) to access client data (151, 152) stored in the private cloud (140) while the clients (100, 101) are separated from the private cloud (140) by a firewall (160) via secure socket layer connections (170, 171) that support a VPN network including the clients (100, 101), the public cloud server (120), and the private cloud (140). Each component of the system is discussed below.

Figure 2:
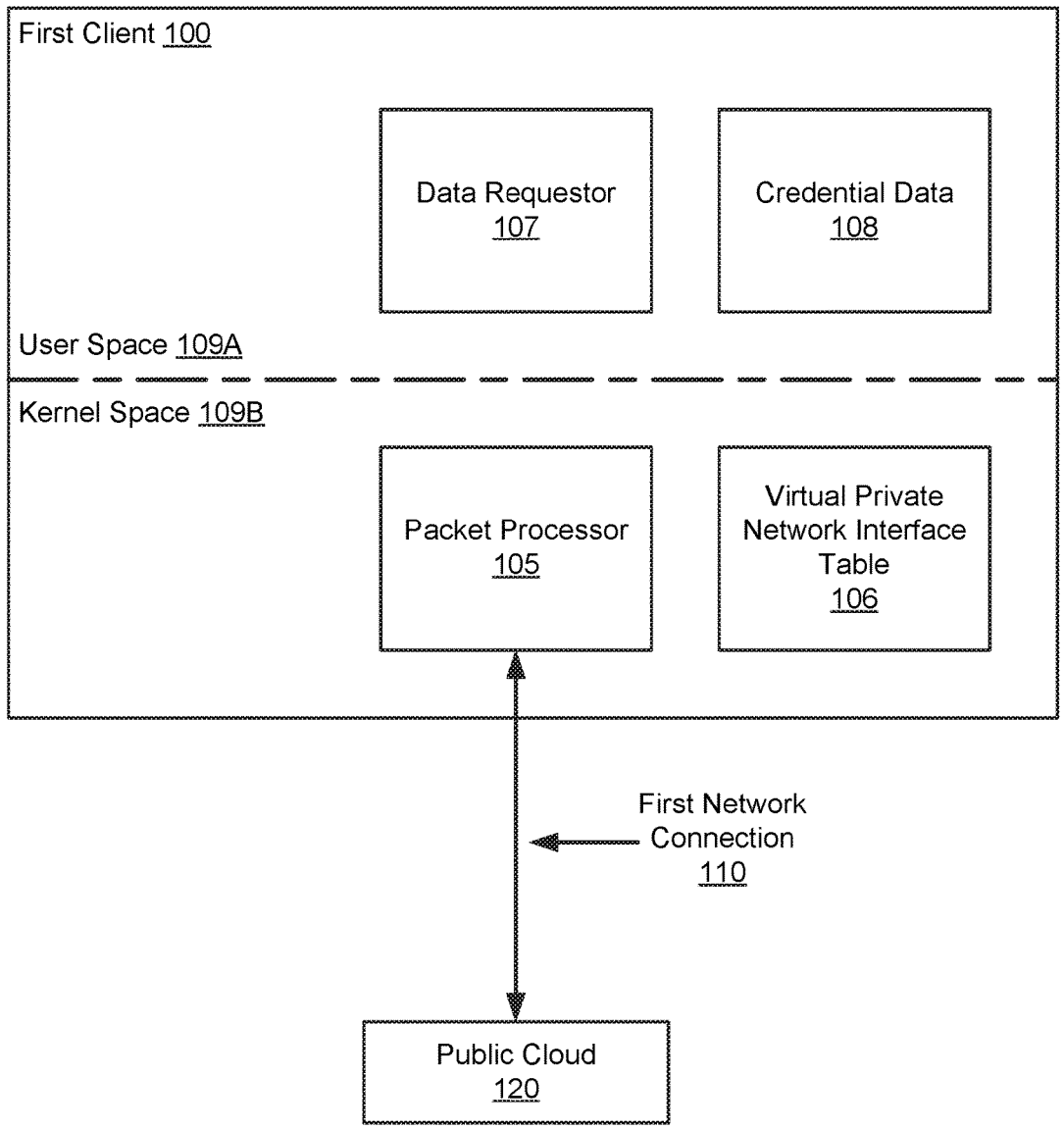
FIG. 2 shows a diagram of a client in accordance with one or more embodiments of the invention.

FIG. 2 shows a diagram of a first client (100) in accordance with one or more embodiments of the invention. The first client (100) may be a computing device. The computing devices may be, for example, a mobile phone, a tablet computer, a laptop computer, a desktop computer, or a server. The computing device may include one or more processors, memory (e.g., random access memory), and persistent storage (e.g., disk drives, solid state drives, etc.). The persistent storage may store computer instructions, e.g., computer code, that when executed by the processor(s) of the computing device to perform the functions described in this application and illustrated in at least FIG. 6. The first client (100) may be other types of computing devices without departing from the invention.

The first client (100) may include a packet processor (105), a VPN interface table (106), a data requestor (107), and credential data (108). The packet processor (105) may be implemented in kernel space (109B) while the data requestor (107) and the credential data (108) may be implemented in user space (109A). Each component of the first client (100) is discussed below.

The first client (100) may be operably linked to the public cloud server (120) via a first network connection (110). The packet processor (105) may send packets to the public cloud server (120) utilizing the first network connection (110).

In one or more embodiments of the invention, the packet processor (105) may be a physical device. The physical device may include circuitry. The physical device may be, for example, a field-programmable gate array, application specific integrated circuit, programmable processor, microcontroller, digital signal processor, or other hardware processor. The physical device may be adapted to send packets via a network. The network may be, for example, an internet protocol (IP) network. In one or more embodiments of the invention, the packet processor (105) may be adapted to support communications via a VPN overlaying an IP network. Specifically, the packet processor (105) may be adapted to utilize a VPN interface table (106) to transmit packets to other devices via the network to facilitate the operation of the VPN.

In one or more embodiments of the invention, the VPN interface table (106) may be a data structure stored on a physical device that facilitates communications via a VPN. The physical device may include circuitry. The data stored in the VPN interface table (106) may specify the underlying hardware connections used to facilitate data transmission via logical connections between devices defined by the VPN. In one or more embodiments of the invention, the VPN interface table (106) may associate a port of a client (100) with the private cloud (140) and/or a second port of the client (100) with the public cloud server (120).

In one or more embodiments of the invention, the first client (100) may include functionality to send communications via a VPN that utilizes the network connections (110). In one or more embodiments of the invention, the first client (100) utilize the VPN interface table (106) to send data to other devices connected by an established VPN. More specifically, the packet processor (105) may utilize the VPN interface table (106) to send data using the logical connections specified by the VPN interface table via the underlying hardware connections specified by the VPN interface table for each logical connection.

The credential data (108) may be a data structure stored on physical storage that includes credentials for accessing the public cloud server and the private cloud, referred to as public cloud access credentials and private cloud access credentials, respectively. When attempting to access data stored in the private cloud (140), the clients (100, 101) may include the aforementioned credentials in the data access request to authenticate to the public cloud server (120) and private cloud (140), respectively, that the first client (100) is authorized to access the aforementioned clouds.

In one or more embodiments of the invention, the credential data (108) may include a user name and a key for each of the public cloud server (120) and the private cloud (140). The credential data (108) may include credentials associated with other computing devices without departing from the invention. The key may be, for example, a password, bit sequence, or other data. The user name may be, for example, an email address, name of a person using the first client (100), or an arbitrarily selected string of characters. The credential data (108) may include more, less, or different data used to enable the first client (100) to access the public cloud server (120), private cloud (140), or other computing devices without departing from the invention.

The second client (101) may include similar components to the first client (100) and may communicate with the public cloud server (120) via the second network connection (111) rather than the first network connection (110).

Figure 3:
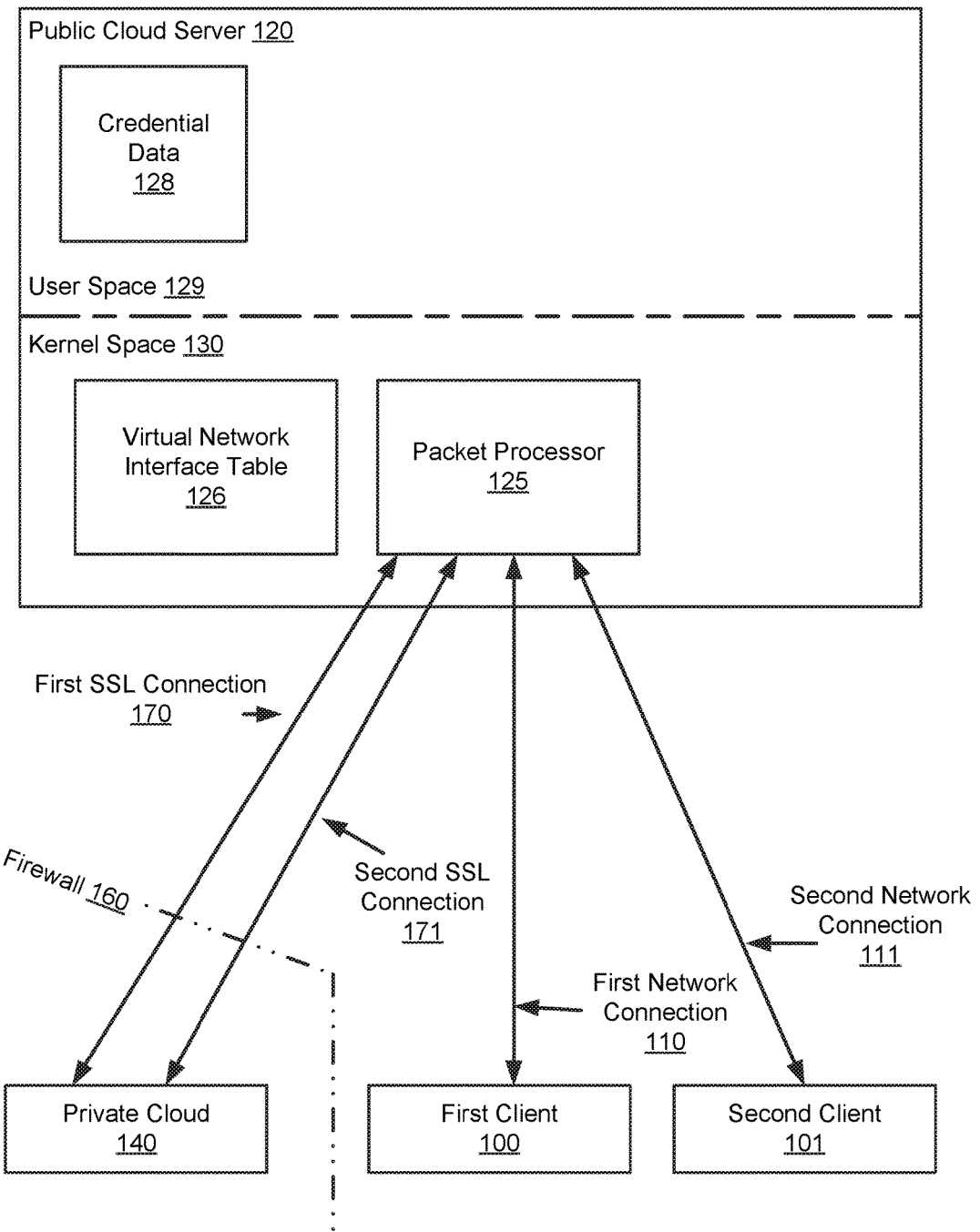
FIG. 3 shows a diagram of a public cloud server in accordance with one or more embodiments of the invention.

FIG. 3 shows a diagram of a public cloud server (120) in accordance with one or more embodiments of the invention. The public cloud server (120) may be a computing device. The computing devices may be, for example, a mobile phone, a tablet computer, a laptop computer, a desktop computer, or a server. The computing device may include one or more processors, memory (e.g., random access memory), and persistent storage (e.g., disk drives, solid state drives, etc.). The persistent storage may store computer instructions, e.g., computer code, that when executed by the processor(s) of the computing device to perform the functions described in this application and illustrated in at least FIG. 7. The public cloud server (120) may be other types of computing devices without departing from the invention.

The public cloud server (120) may include a packet processor (125), a VPN interface table (126), and credential data (128). The packet processor (125) may be implemented in kernel space (130) while the credential data (108) may be implemented in user space (129). Each component of the public cloud server (120) is discussed below.

The public cloud server (120) may be operably connected to the clients (100, 101, FIG. 1) via the first network connection (110) and the second network connection (111). The public cloud server 9120) may be operably connected to the private cloud (140) via SSL connections (170, 171) associated with each client, respectively. The packet processor (125) may forward packets between the clients and the private cloud (140).

In one or more embodiments of the invention, the packet processor (125) may be a physical device. The physical device may include circuitry. The physical device may be, for example, a field-programmable gate array, application specific integrated circuit, programmable processor, microcontroller, digital signal processor, or other hardware processor. The physical device may be adapted to send packets via a network. The network may be, for example, an internet protocol (IP) network. In one or more embodiments of the invention, the packet processor (125) may be adapted to support communications via a VPN overlaying an IP network. Specifically, the packet processor (125) may be adapted to utilize a VPN interface table (126) to transmit packets to other devices via the network to facilitate the operation of the VPN.

In one or more embodiments of the invention, the VPN interface table (126) may be a data structure stored on a physical device that facilitates communications via a VPN. The physical device may include circuitry. The data stored in the VPN interface table (126) may specify the underlying hardware connections used to facilitate data transmission via logical connections between devices defined by the VPN.

In one or more embodiments of the invention, the public cloud server (120) may include functionality to send communications via a VPN that utilizes the network connections (110, 111) and the SSL connections (170, 171). In one or more embodiments of the invention, the public cloud server (120) utilizes the VPN interface table (126) to send data to other devices connected by an established VPN. More specifically, the packet processor (125) may utilize the VPN interface table (126) to send data using the logical connections specified by the VPN interface table via the underlying hardware connections specified by the VPN interface table for each logical connection.

The credential data (128) may be a data structure stored on physical storage that includes client authentication credentials used to authenticate clients (100, 101) before allowing the clients to access the data stored in the private cloud. When a client attempts to access data stored in the private cloud (140), the public cloud server (120) may first match public cloud access credentials included in the data access request to the client authentication credentials of the credential data (128). If the credentials match, the public cloud server (120) may cooperate with the client (100, 101) to access data stored in the private cloud (140).

In one or more embodiments of the invention, the client authentication credentials of the credential data (128) may include a user name and a key for each client that is authorized to obtain data from the private cloud. The user name may be, for example, an email address, name of a person using a client, or an arbitrarily selected string of characters.

As discussed above, the public cloud server (120) may cooperate with clients to obtain data from the private cloud (140).

Figure 4:
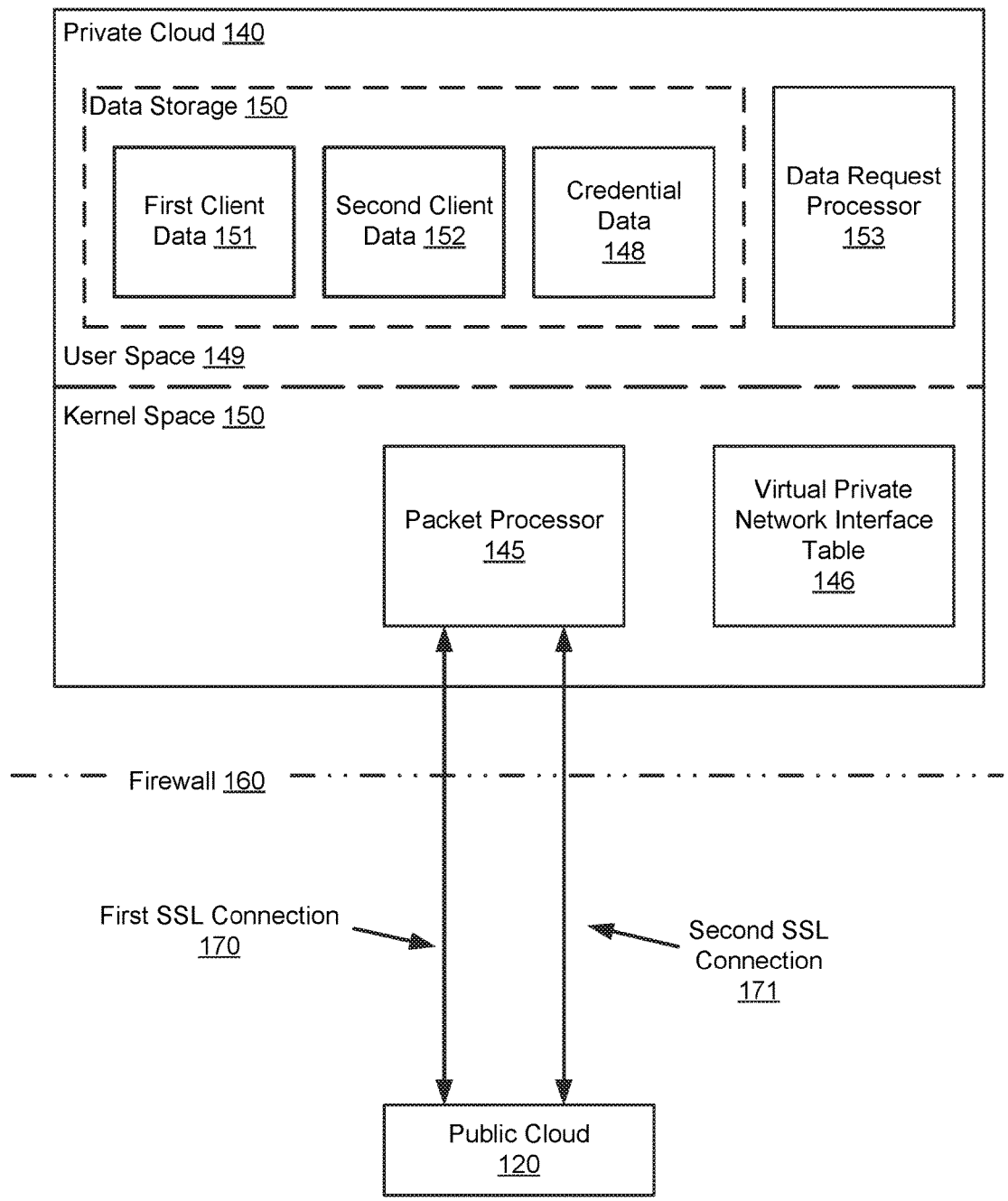
FIG. 4 shows a diagram of a private cloud in accordance with one or more embodiments of the invention.

FIG. 4 shows a diagram of a private cloud (140) in accordance with one or more embodiments of the invention. The private cloud (140) may be a computing device. The computing devices may be, for example, a server or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device to perform the functions described in this application and illustrated in at least FIG. 5. The private cloud (140) may be other types of computing devices without departing from the invention.

The private cloud (140) may include a packet processor (145), a VPN interface table (146), a data request processor (153), and data storage (150). The packet processor (125) and/or VPN interface table (146) may be implemented in kernel space (130) while the data request processor (153) and data storage (150) may be implemented in user space (129). Each component of the private cloud (140) is discussed below.

The private cloud (140) may be operably connected to the public cloud server (120) via network connections. The network connections may include a distinct SSL connection for each client when the clients are accessing data stored in the private cloud (140). In one or more embodiments of the invention, the SSL connections are persistent SSL connections. The packet processor (145) may send packets to the public cloud server (120) using the SSL connections (170, 171).

In one or more embodiments of the invention, the packet processor (145) may be a physical device. The physical device may include circuitry. The physical device may be, for example, a field-programmable gate array, application specific integrated circuit, programmable processor, microcontroller, digital signal processor, or other hardware processor. The physical device may be adapted to send packets via a network. The network may be, for example, an internet protocol (IP) network. In one or more embodiments of the invention, the packet processor (145) may be adapted to support communications via a VPN overlaying an IP network. Specifically, the packet processor (145) may be adapted to utilize a VPN interface table (146) to transmit packets to other devices via the network to facilitate the operation of the VPN.

In one or more embodiments of the invention, the VPN interface table (146) may be a data structure stored on a physical device that facilitates communications via a VPN. The physical device may include circuitry. The data stored in the VPN interface table (146) may specify the underlying hardware connections used to facilitate data transmission via logical connections between devices and defined by the VPN.

In one or more embodiments of the invention, the private cloud (140) may include functionality to send communications via a VPN that utilizes the SSL connections (170, 171). In one or more embodiments of the invention, the private cloud (140) utilizes the VPN interface table (146) to send data to other devices connected by an established VPN, and specifically the clients via the public cloud server (120). More specifically, the packet processor (145) may utilize the VPN interface table (146) to send data using the logical connections specified by the VPN interface table via the underlying hardware connections specified by the VPN interface table for each logical connection.

The data storage (150) may store data. The data may include first client data (151), second client data (152), and credential data (148)

In one or more embodiments of the invention, the data storage (150) may be a physical device. For example, the data storage (150) may be hard disk drives, solid disk drives, tape drives, zip drives, or other types of physical storage devices.

In one or more embodiments of the invention, the data storage (150) may be a physical device. For example, the data storage (150) may be hard disk drives, solid disk drives, tape drives, zip drives, or other types of physical storage devices.

In one or more embodiments of the invention, the data storage (150) may be cloud resources. The cloud resources may be a logical storage that includes any number of physical storage devices distributed across any number of computing devices and operable linked and/or unified to form the logical storage. The logical storage may include redundancy or other data integrity features that ensure that failure of any of the physical storage elements does not cause data stored in the logical storage to be lost. The physical resources of the logical storage of the cloud resources may be physically separated across a number of computing devices other than the data storage device that are each operably connected to the cloud server (140).

In one or more embodiments of the invention, the data storage (150) may be a logical storage. The logical data storage comprising any number of physical and/or cloud resources linked to form a single logical storage. The physical resources may be, for example, hard disk drives, solid state drives, or any other type of persistent storage.

The cloud resources may be a second logical storage that includes any number of physical storage devices operable linked and/or unified to form a logical storage. The second logical storage may include redundancy or other data integrity features that ensure that failure of any of the physical storage elements does not cause data stored in the logical storage to be lost. The physical resources of the second logical storage of the cloud resources may be physically separated across a number of computing devices other than the data storage device that are each operably connected to the data storage device.

In one or more embodiments of the invention, the data storage (150) may be a deduplicated storage. As used herein, a deduplicated storage refers to a storage that attempts to reduce the required amount of storage space to store data by not storing multiple copies of the same files or bit patterns. Rather, when a new file or bit pattern is sent to the data storage (150) for storage, the data storage (150) may compare all or a portion of the new file or bit pattern to files or bit patterns already stored in the data storage (150). If the new file or bit pattern, or a portion thereof, matches a file or bit pattern, or a portion thereof, already stored in the data storage (150), the new file or bit pattern, or portion thereof, is not stored in the data storage (150) and the already stored file or bit pattern, or portion thereof, is associated with the filename included in the data storage request for later retrieval.

In one or more embodiments of the invention, a file or bit pattern stored in the data storage (150) may be associated with multiple clients. For example, if a first client requests that a unique file be stored in the data storage (150), the data storage (150) will store the unique file and only associate the stored unique file with the first client. However, if a second client requests that the unique file be stored in the data storage (150) after the unique file is already stored in the data storage (150), the data storage (150) will not store a second copy of the unique file in the data storage (150) but will associate the already stored file stored by the first client with the second client.

Thus, if a first client and a second client have requested that a unique file be stored in the data storage (150), each of the clients' file names for the unique file, or other identification information, will be associated with the stored unique file. Thus, the data of the stored unique file may be retrieved from the data storage (150) using any filename (or other identifier) given to the file by a client that requested that the unique file be stored in the data storage (150).

The first client data (151) may be data stored by the first client. More specifically, the first client data (151) may be backup data that enables the first client to restore a condition of a computing device. The first client data (151) may be other types of data without departing from the invention.

The second client data (152) may be data stored by the second client. More specifically, the second client data (152) may be backup data that enables the second client to restore a condition of a computing device. The second client data (152) may be other types of data without departing from the invention.

The credential data (148) may includes client authentication credentials used to authenticate clients (100, 101) before allowing the clients to access the data, e.g., first client data (151) or second client data (152), stored in the data storage (150). When a client attempts to access data stored in the private cloud (140), the private cloud (140) may first match private cloud access credentials included in the data access request to the client authentication credentials of the credential data (148). If the credentials match, the private cloud (140) may cooperate with the client (100, 101) to access data stored in the private cloud (140).

In one or more embodiments of the invention, the client authentication credentials of the credential data (148) may include a user name and a key for each client that is authorized to obtain data from the private cloud. The user name may be, for example, an email address, name of a person using a client, or an arbitrarily selected string of characters.

In one or more embodiments of the invention, the client authentication credentials of the credential data (148) is different from the client authentication credentials of the credential data (128) of the public cloud server (120). For example, the user name associated with a user for accessing the public cloud server (120) may be a different name than the user name associated with the user for accessing the private cloud (140).

In one or more embodiments of the invention, the client authentication credentials of the credential data (148) is the same as the client authentication credentials of the credential data (128) of the public cloud server (120). For example, the user name associated with a user for accessing the public cloud server (120) may be the same name as the user name associated with the user for accessing the private cloud (140).

The data request processor (153) may processes data access requests from clients and supply the data to the clients from the data storage (150). In one or more embodiments of the invention. The data request processor (153) may supply the data to the clients by sending it via a VPN using the packet processor. More specifically, the data request processor (153) may stream the requested data from the data storage (150) to the packet processor (145). The packet processor (145) may generate packets including the streamed data. The generated packets may be addressed to the clients via the VPN. The packets may then be sent via the VPN.

Figure 5:
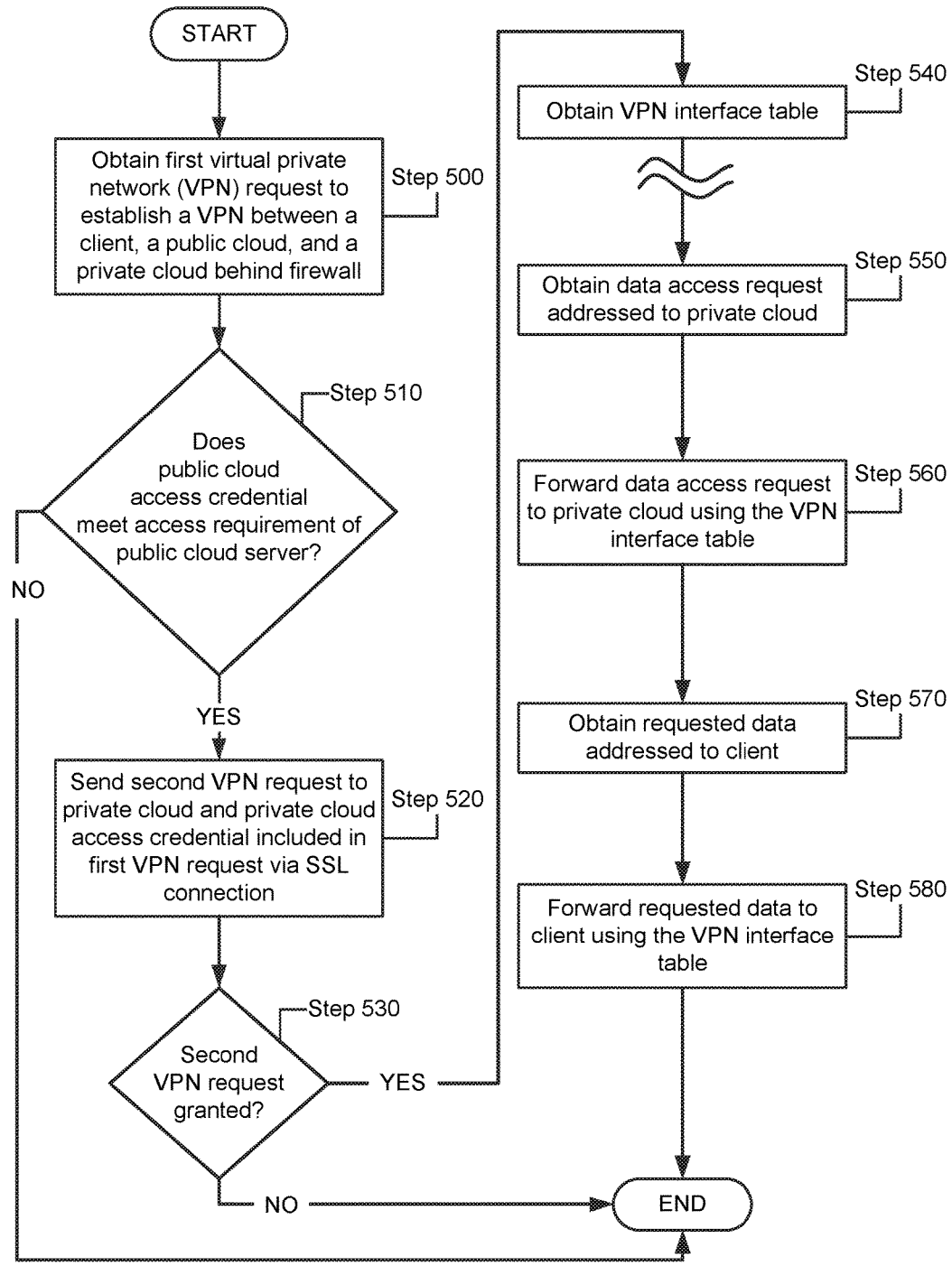
FIG. 5 shows a flowchart of a method of operating a public cloud server in accordance with one or more embodiments of the invention.
Figure 6:
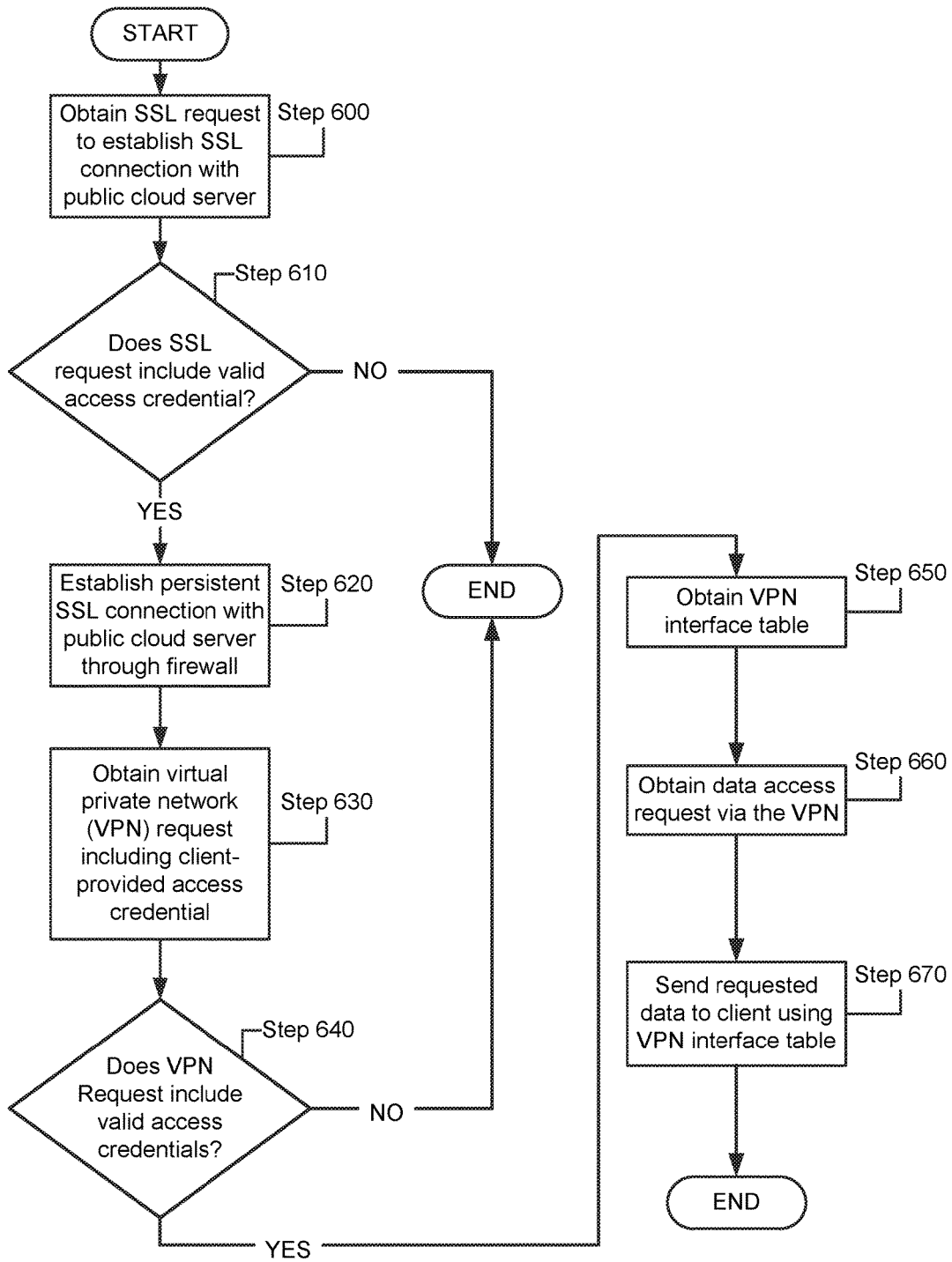
FIG. 6 shows a flowchart of a method of operating a private cloud in accordance with one or more embodiments of the invention.
Figure 7:
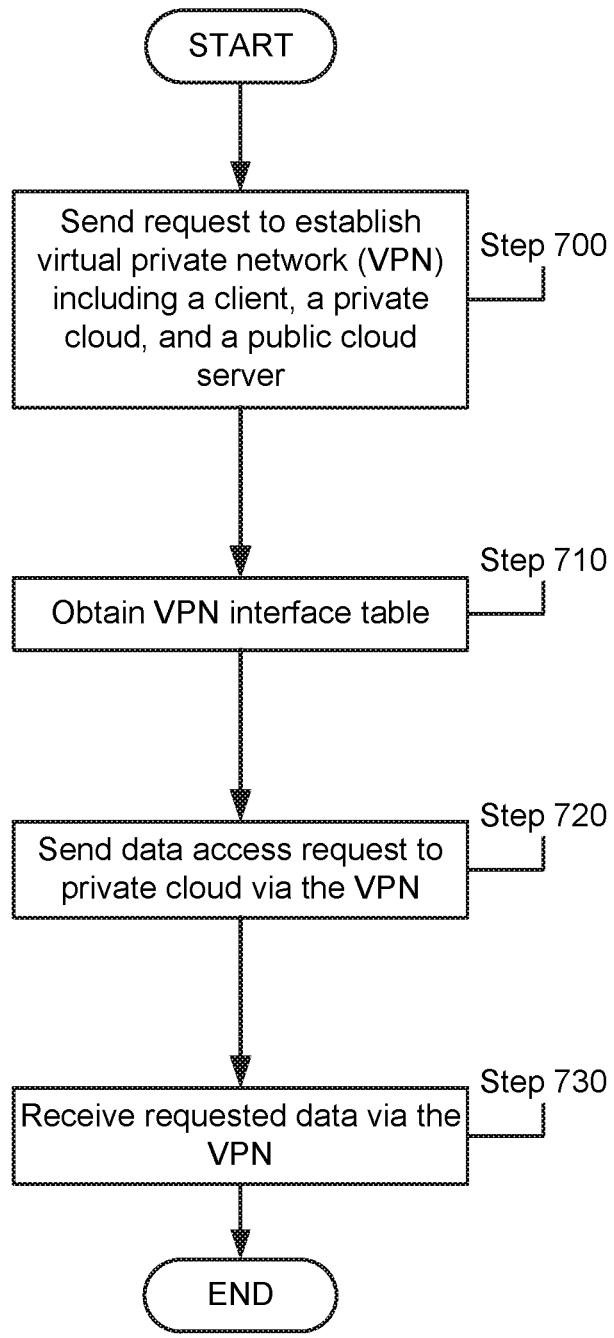
FIG. 7 shows a flowchart of a method of operating a client in accordance with one or more embodiments of the invention.

FIGS. 5-7 show flowcharts of methods that may be performed by the system of FIG. 1. The illustrated methods may enable a client to obtain data from a private cloud separate from the client by a firewall. In one or more embodiments of the invention, the client may store backup data in the private cloud. Obtaining the data from the private cloud may enable the client to restore the client to a previous state, recover data lost by the client, or otherwise obtain data to which the client could no longer access. The data stored in the private cloud may be other types of data without departing from the invention.

FIG. 5 shows a flowchart in accordance with one or more embodiments of the invention. The method depicted in FIG. 5 may be used to assist a client obtain data from a private cloud in accordance with one or more embodiments of the invention. The method shown in FIG. 5 may be performed by, for example, a public cloud server (120, FIG. 1).

In Step 500, a first request to establish a VPN between a client, a public cloud server, and a private cloud is obtained. The request may be obtained by receiving the request from the client via a network connection.

In Step 510, it is determined whether a public cloud access credential meets an access requirement of the public cloud server. The public cloud access credential may be included in the request to establish a VPN. The access requirement may be that the public cloud access credential matches a credential data stored on the public cloud server. The credential data may be, for example, client authentication credentials stored in data storage of the public cloud server. The credential data may be stored on a different computing device without departing from invention.

If the public cloud access credential meets the access requirement, the method may proceed to Step 520. If the public cloud access credential does not meet the access requirement, the method may end.

In Step 520, a second request to establish a VPN between the client, the public cloud server, and the private cloud is sent to the private cloud via an SSL connection. In one or more embodiments of the invention, the SSL connection is a persistent SSL connection that is associated with the client.

In one or more embodiments of the invention, the SSL connection is established by the public cloud server after obtaining the first request to establish the VPN. In one or more embodiments of the invention, private cloud access credentials associated with the public cloud server may be sent to the private cloud when establishing the SSL connections. The private cloud access credentials associated with the public cloud server may enable the private cloud to verify that the public cloud server is authorized to establish a SSL connection with the private cloud server.

In one or more embodiments of the invention, private cloud access credentials associated with the client may be included in the second request to establish a VPN. The private cloud access credentials may have been included in the first request to establish a VPN sent to the public cloud server from the client. The private cloud access credentials associated with the client may be different from the public cloud access credentials. The private cloud access credentials associated with the client may be the same as the public cloud access credentials without departing from the invention. The private cloud access credentials associated with the client may be different from the private cloud access credentials associated with the public cloud server. The private cloud access credentials associated with the client may be the same as the private cloud access credentials associated with the public cloud server without departing from the invention.

In one or more embodiments of the invention, private cloud access credentials may be included in the second request to establish a VPN. The private cloud access credentials may have been stored in data storage of the public cloud server. The private cloud access credentials may be associated with the client.

In one or more embodiments of the invention, the public cloud server sends a request to the private cloud server via an existing VPN that utilizes an existing SSL connection to establish another SSL connection, i.e., newly established SSL connection, before sending the second VPN request and the private cloud access credentials included in the first VPN request. The second VPN request and the private cloud access credentials may be sent via the newly established SSL connection.

In one or more embodiments of the invention, the private cloud and the public cloud server may be part of an existing VPN before the method in FIG. 5 is performed. The existing VPN may be established by having the private cloud initiate a SSL connection with the public cloud server and initiate establishing the VPN.

In Step 530, it is determined whether VPN access to the private cloud based on the private cloud access credentials has been granted. If VPN access to the private cloud has been granted, the method may proceed to step 530. If VPN access to the private cloud has not been granted, the method may end following Step 530.

In Step 540, a VPN interface table is obtained. The VPN interface table may specify logical connections between the client, the public cloud server, and the private cloud. The logical connections may utilize the SSL connection between the public cloud server and the private cloud. The logical connections may utilize the network connection between the public cloud server and the client.

In one or more embodiments of the invention, the VPN interface table may be obtained by being generated by the public cloud server. In one or more embodiments of the invention, the VPN interface table is obtained by receiving the VPN interface table from the client or the private cloud.

Upon completion of Step 540, the VPN including the client, public cloud server, and the private cloud server may be operational. In other words, the VPN configuration may be complete a data may be sent via the VPN.

In Step 550, a data access request addressed to the private cloud is obtained by the public cloud server. The data access request may be obtained by receiving the data access request from the client via the VPN. More specifically, packets including the data access request may be received form the client via the VPN.

In Step 560, the data access request is forwarded to the private cloud using the VPN interface table. The data access request may be forwarded by forwarding the packets received from the client that include the data access request. The packets may be forwarded using a logical connection specified by the VPN interface table. The logical connection may specify that the packets are to be forwarded using, at least in part, the SSL connection. The logical connection may be specified as an entry of the VPN interface table, e.g., a mapping between the private cloud and the port of the public cloud server supporting the SSL connection.

In Step 570, the requested data is obtained from the private cloud via the VPN. The requested data may be obtained by receiving packets from the private cloud via the VPN that includes the requested data.

In Step 580, the requested data is forwarded to the client. The requested data may be forwarded to the client by forwarding the packets received from the private cloud that include the requested data using the VPN interface table. The packets including the requested data may be forwarded to the client using a logical connection specified by the VPN interface table. The logical connection may specify that the packets including the requested data are to be forwarded using, at least in part, the network connection between the public cloud server and the client. The logical connection may be specified as a second entry of the VPN interface table, e.g., a second mapping between the client and a port of the public cloud server supporting the network connection.

The method may end following Step 580.

FIG. 6 shows a flowchart in accordance with one or more embodiments of the invention. The method depicted in FIG. 6 may be used to provide data from a private cloud to a client in accordance with one or more embodiments of the invention. The method shown in FIG. 6 may be performed by, for example, a private cloud (e.g., 140, FIG. 1).

In Step 600, a request to establish a SSL connection between the private cloud and a public cloud server is obtained. The request may be obtained by receiving the request from the public cloud server. The request may include private cloud access credentials associated with the public cloud server.

In Step 610, it is determined whether the SSL request included valid access credentials. The access credentials, i.e., the private cloud access credentials associated with the public cloud server, may be compared to public cloud server authentication credentials to determine if the access credentials are valid.

If the private cloud access credentials associated with the public cloud server are valid, the method may proceed to Step 620. If the private cloud access credentials associated with the public cloud server are not valid or not included, the method may end.

In Step 620, a SSL connection with the private cloud server through a firewall that separates the private cloud from the public cloud server is established. The SSL connection may be associated with a client that is connected to the public cloud server. The SSL connection may be a persistent SSL connection.

In Step 630, a request to establish a VPN including the private cloud, the public cloud server, and the client connected to the public cloud server is obtained. The request may be the second VPN request discussed with respect to FIG. 5. The request may include private cloud access credentials associated with the client.

In Step 640, it is determined whether request to establish the VPN request includes valid access credentials. The access credentials, i.e., the private cloud access credentials associated with the client, may be compared to client authentication credentials to determine if the access credentials are valid. If the access credentials are valid, the method may proceed to step 650. If the access credentials are not valid or not included in the VPN request, the method may end following Step 640.

In Step 650, a VPN interface table is obtained. The VPN interface may be obtained by being generated by the private cloud or may be obtained by receiving the VPN interface table from the client or the public cloud server. The VPN interface table may specify logical connections between the client, the public cloud server, and the private cloud. The logical connections may utilize the SSL connection between the public cloud server and the private cloud. The logical connections may utilize the network connection between the public cloud server and the client.

In Step 660, a data access request is obtained. The data access request may be obtained by receiving packets from the public cloud server including the data access request via the VPN. The data access request may specify data that is stored in the private cloud and that is associated with the client.

In Step 670, the requested data is sent to the client. The data may be sent to the client by generating packets including the data and sending the generated packets to the client using the VPN interface table. The packets may be sent using a logical connection specified by the VPN interface table. The logical connection may specify that the packets are to be sent using, at least in part, the SSL connection between the private cloud and the public cloud server. The logical connection may be specified as an entry of the table, e.g., a mapping between the client and the port of the public cloud server that supports the SSL connection.

The method may end following Step 670.

FIG. 7 shows a flowchart in accordance with one or more embodiments of the invention. The method depicted in FIG. 7 may be used to obtain data from a private cloud in accordance with one or more embodiments of the invention. The method shown in FIG. 7 may be performed by, for example, a client (e.g., 100, FIG. 1).

In Step 700, a request to establish a VPN including the client, a private cloud, and a public cloud server is sent to the public cloud server. The request may include public cloud server access credentials and private cloud access credentials. The method may end if the request is denied.

In Step 710, a VPN interface table is obtained. The VPN interface table may be obtained by being generated by the client or may be obtained by being received from the public cloud server or the private cloud. The VPN interface table may specify logical connections between the client, the public cloud server, and the private cloud.

In Step 720, a data access request is sent to the private cloud via the VPN. The SSL connection may be associated with a client that is connected to the public cloud server.

In Step 730, data specified by the data access request is received via the VPN.

The method may end following Step 730.

Many variations on the devices, systems, and methods shown in FIGS. 1-7 are possible without diverting from the invention. The following are examples of uses of the disclosed devices, systems, and methods.

Example 1

At a first point in time, a client may be connected to a private cloud storing data of the client. The stored data may enable the client to recover a previous state. At the first point in the time, the client may be connected to the private cloud without being separated from the private cloud by a firewall. The client may be connected to the private cloud via a VPN.

At a second point in time, an event may cause the client to move to a new location that separates the client from the private cloud by a firewall. In response to the change in network topology, the client may contact a public cloud server. The public cloud server may then perform the method described with respect to FIG. 5 to enable the client to access the data stored in the private cloud.

Example 2

At a first point in time, a client may be connected to a private cloud storing data of the client. The stored data may enable the client to recover a previous state. At the first point in the time, the client may be connected to the private cloud without being separated from the private cloud by a firewall. The client may be connected to the private cloud and a public cloud server via a VPN.

At a second point in time, an event may cause the client to move to a new location that separates the client from the private cloud by a firewall. In response to the change in network topology, the client may notify the public cloud server of its change in location. The public cloud server may then update the VPN between the client, the public cloud server, and the private cloud based on the notification by the client. In other words, the public cloud server will update the VPN so that additional configuration changes such as a modification of an active directory, a modification of a domain name server, a modification of a network address translation, and/or a modification of a firewall are not required to enable the client to access the data stored in the private cloud.

Example 3

At a first point in time, a client may send a request to a public cloud server to establish a VPN between the client and a plurality of computing devices. Each of the computing devices may be, for example, laptop computers, desktop computers, cell phones, or any other types of computing devices.

In response to the request, the public cloud server may perform steps 500, 510, and 520 shown in FIG. 5, for each device but will address the second VPN request to each corresponding device rather than the private cloud. The public cloud server will then perform Steps 530 and 540. Once completed, the client will be connected to a number of computing devices via the VPN. Some of the computing devices will be separated from the client by a firewall.

Example 4

At a first point in time, a client may send a request to a public cloud server to establish a VPN between the client and a plurality of embedded computing devices. The embedded computing devices may be cameras, sensors, actuators, appliance, or any other type of traditional device that has been modified to include an embedded computing device. In one variation, the embedded computing device may be an Internet of Things (JOT) device.

In response to the request, the public cloud server may perform steps 500, 510, and 520 shown in FIG. 5, for each embedded computing device but will address the second VPN request to each corresponding embedded computing device rather than the private cloud. The public cloud server will then perform Steps 530 and 540. Once completed, the client will be connected to a number of embedded computing devices via the VPN. Some of the embedded computing devices will be separated from the client by a firewall.

One or more embodiments of the invention may be implemented using instructions executed by one or more processors in the data storage device. Further, such instructions may correspond to computer readable instructions that are stored on one or more non-transitory computer readable mediums.

While in the above, various connections are described as SSL connections, other secure connections could be used without departing from the invention. For example, transport security layer (TSL) connections may be used in place of SSL connections.

In one or more embodiments of the invention, connections between one or more of the devices described may include, at least in part, connections through the Internet. In one or more embodiments of the inventions, connections between one or more of the devices described may include, at least in part, connections through private networks. In one or more embodiments of the invention, the VPN described may utilize physical connections that include Internet connections and/or private network connections.

One or more embodiments of the invention may enable one or more of the following: i) enable a client to obtain data stored in a private cloud separated from the client by a firewall, ii) reduce a cognitive burden on a user of the client when attempting to access data stored in a firewalled network resource by automatically establishing a VPN when accessing data stored in the private cloud, and iii) reduce the likelihood of a data breach by distributing authentication of the client across multiple network devices.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A public cloud server in a public cloud, comprising:
a processor programmed to:
obtain, from a first client via a first network connection, a data access request that specifies data stored in a private cloud separated from the public cloud server by a firewall,
authenticate access to the data, for the first client, using credential data stored in the public cloud server,
send the data access request to the private cloud through the firewall via a second network connection,
receive the data stored in the private cloud via the second network connection, and
forward, using a virtual private network (VPN) interface table, the received data stored in the private cloud to the first client,
wherein the public cloud server comprises the VPN interface table, and
wherein the VPN interface table specifies logical network connections between the first client, the public cloud server, and the private cloud.

2. The public cloud server of claim 1, wherein the second network connection is a secure socket layer connection.

3. The public cloud server of claim 1, wherein the data access request is sent to the private cloud using the VPN interface table.

4. The public cloud server of claim 1, wherein the logical network connections route IP traffic through a secure socket layer (SSL) connection.

5. The public cloud server of claim 4, wherein the second network connection is a SSL connection, and wherein the first network connection is not a SSL connection.

6. The public cloud server of claim 1, wherein the first network connection is a connection through the Internet.

7. The public cloud server of claim 1, wherein the data access request comprises:
a first credential associated with the public cloud server; and
a second credential associated with the private cloud.

8. The public cloud server of claim 1, wherein the processor is further programmed to:
obtain, from a second client, a second data access request that specifies second data stored in the private cloud;
in response to obtaining the second data access request, establish a third network connection, wherein the third network connection is a secure socket layer link connection between the public cloud server and the private cloud;
send the second data access request to a private cloud server via the third network connection;
receive the second data stored in the private cloud via the third network connection; and
forward the second data to the second client.

9. The public cloud server of claim 8, wherein the processor is further programmed to:
after establishing the third network connection, establish a virtual private network (VPN), wherein the VPN specifies logical connections between the second client, the public cloud, and the private cloud.

10. The public cloud server of claim 9, wherein the second data access request is sent to the private cloud server using the VPN.

11. The public cloud server of claim 9, wherein the second data is forwarded to the second client using the VPN.

12. The public cloud server of claim 1, wherein the processor is further programmed to:
before sending the data access request to the private cloud, establish a virtual private network (VPN),
wherein the VPN specifies logical connections between the first client, the public cloud, and the private cloud.

13. The public cloud server of claim 12, wherein the data access request is sent to the private cloud using the VPN.

14. The public cloud server of claim 12, wherein the data is forwarded to the first client using the VPN.

15. A method of operating a public cloud server in a public cloud, comprising:
obtaining, by the public cloud server from a first client via a first network connection, a data access request that specifies data stored in a private cloud separated from the public cloud server by a firewall,
authenticating access to the data, for the first client, using credential data stored in the public cloud server,
sending, by the public cloud server, the data access request to the private cloud through the firewall via a second network connection,
receiving, by the public cloud server, the data stored in the private cloud via the second network connection, and
forwarding, by the public cloud server using a virtual private network (VPN) interface table, the received data stored in the private cloud to the first client,
wherein the VPN interface table specifies logical network connections between the first client, the public cloud server, and the private cloud.

16. The method of claim 15, further comprising:
before sending the data access request to the private cloud, establishing a virtual private network (VPN),
wherein the VPN specifies logical connections between the first client, the public cloud, and the private cloud.

17. A non-transitory computer readable medium comprising computer readable program code, which when executed by a computer processor enables the computer processor to perform a method for operating a public cloud server in a public cloud, the method comprising:
obtaining, by the public cloud server from a first client via a first network connection, a data access request that specifies data stored in a private cloud separated from the public cloud server by a firewall,
authenticating access to the data, for the first client, using credential data stored in the public cloud server,
sending, by the public cloud server, the data access request to the private cloud through the firewall via a second network connection,
receiving, by the public cloud server, the data stored in the private cloud via the second network connection, and
forwarding, by the public cloud server using a virtual private network (VPN) interface table, the received data stored in the private cloud to the first client,
wherein the VPN interface table specifies logical network connections between the first client, the public cloud server, and the private cloud.

18. The non-transitory computer readable medium of claim 17, wherein the method further comprises:
before sending the data access request to the private cloud, establishing a virtual private network (VPN),
wherein the VPN specifies logical connections between the first client, the public cloud, and the private cloud.

* * * * *